United States Patent
Blum et al.

(10) Patent No.: US 7,524,953 B2
(45) Date of Patent: Apr. 28, 2009

(54) TRIPHENDIOXAZINE PIGMENTS

(75) Inventors: David Blum, Bad Soden (DE); Carsten Plueg, Seeheim-Jugenheim/Ober-Beerbach (DE); Tanja Reipen, Mainz (DE)

(73) Assignee: Clariant Produkte (Deutschland) GmbH, Frankfurt (DE)

( * ) Notice: Subject to any disclaimer, the term of this patent is extended or adjusted under 35 U.S.C. 154(b) by 345 days.

(21) Appl. No.: 10/586,093

(22) PCT Filed: Jan. 12, 2005

(86) PCT No.: PCT/EP2005/000197

§ 371 (c)(1), (2), (4) Date: Jul. 13, 2006

(87) PCT Pub. No.: WO2005/068560

PCT Pub. Date: Jul. 28, 2005

(65) Prior Publication Data

US 2008/0234480 A1   Sep. 25, 2008

(30) Foreign Application Priority Data

Jan. 14, 2004   (DE) ................ 10 2004 001 883

(51) Int. Cl.
C07D 498/02 (2006.01)
C09B 19/02 (2006.01)

(52) U.S. Cl. ............... 544/75; 534/635; 534/642; 8/543; 8/549

(58) Field of Classification Search ................ 544/75
See application file for complete search history.

(56) References Cited

U.S. PATENT DOCUMENTS 2,564,381 A   8/1951   Robbins 4,336,377 A   6/1982   Adam et al.

FOREIGN PATENT DOCUMENTS

EP   0400429   12/1990
FR   789805   11/1935

OTHER PUBLICATIONS

PCT International Search Report for PCT/EP2005/000197, Mailed Jul. 4, 2005.
English Translation of PCT International Preliminary Report on Patentability for PCT/EP2005/000197, Oct. 3, 2006.

*Primary Examiner*—Kahsay T Habte
(74) *Attorney, Agent, or Firm*—Anthony A. Bisulca

(57) ABSTRACT

The invention relates to novel triphendioxazine pigments of formula (I)

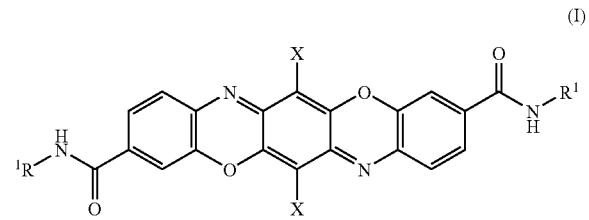

wherein X represents hydrogen or chlorine, while $R^1$ represents phenyl substituted by one to five radicals from the group comprising $C_1$-$C_4$-alkyl, halogen, $C_1$-$C_4$-alkoxy, acetylamino, aminocarbonyl, methylaminocarbonyl and $C_1$-$C_4$-alkoxycarbonyl, or phenyl annelated in the 2,3- or 3,4- with a divalent radical of the formula —NH—(CO)$_m$—NR$^2$—, —CR$^2$=CH—CO—NH—, —CR$^2$=N—CO—NH—, —CO—NH—CO—NR$^2$—, —CO—(NH)$_m$—CO— or —O—(CO)$_m$—NH— so as to form a five- or six-membered ring, $R^2$ representing hydrogen, methyl, ethyl or phenyl and m representing 1 or 2.

9 Claims, No Drawings

TRIPHENDIOXAZINE PIGMENTS

The present invention concerns novel triphendioxazine pigments, a process for their preparation and their use.

Triphendioxazine is a strong chromophore, which occurs in a series of blue and violet dyes and pigments. Various ways are known to prepare them.

In EP-A-0 400 429 substituted triphendioxazines are prepared by cyclizing appropriately substituted benzoquinones in sulfuric acid or oleum that introduce one or more solubilizing sulfo groups into the molecule by the nature of the synthesis and are used as precursors for reactive dyes.

It is an object of the present invention to provide novel red to violet triphendioxazine compounds having pigmentary properties.

We have found that compounds of formula (I) surprisingly have good pigmentary properties.

The unsubstituted compound of formula (I) where X is chlorine and $R^1$ is unsubstituted phenyl has no utility as a pigment because of insufficient lightfastness.

The present invention accordingly provides triphendioxazine pigments of formula (I)

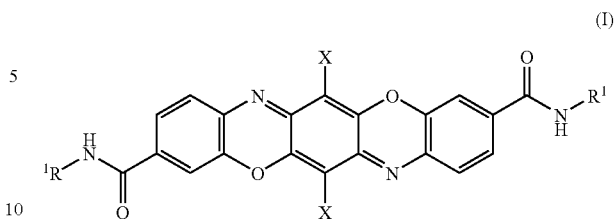

where
X is hydrogen or chlorine, and
$R^1$ is phenyl substituted with 1 to 5 radicals selected from the group consisting of $C_1$-$C_4$-alkyl, halogen, $C_1$-$C_4$-alkoxy, acetylamino, aminocarbonyl, methylaminocarbonyl and $C_1$-$C_4$-alkoxycarbonyl;
or is phenyl fused 2,3- or 3,4- with a bivalent radical of the formula —NH—(CO)$_m$—NR$^2$—, —CR$^2$=CH—CO—NH—, —CR$^2$=N—CO—NH—, —CO—NH—CO—NR$^2$—, —CO—(NH)$_m$—CO— or —O—(CO)$_m$—NH— to form a five- or six-membered ring,
where $R^2$ is hydrogen, methyl, ethyl or phenyl and m is 1 or 2.

Preferred compounds of formula (I) are those of formulae (Ia), (Ib) and (Ic)

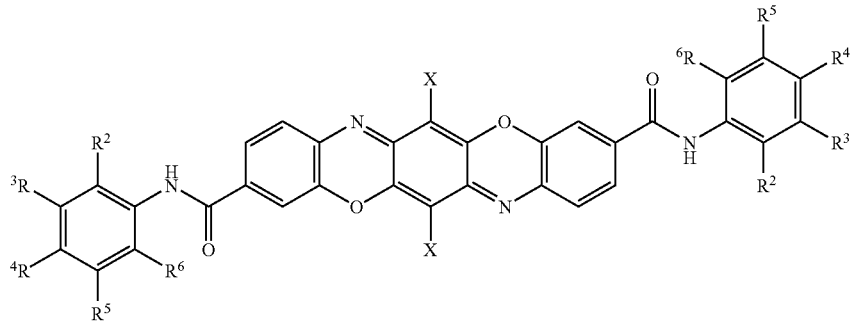

Formula (Ia)

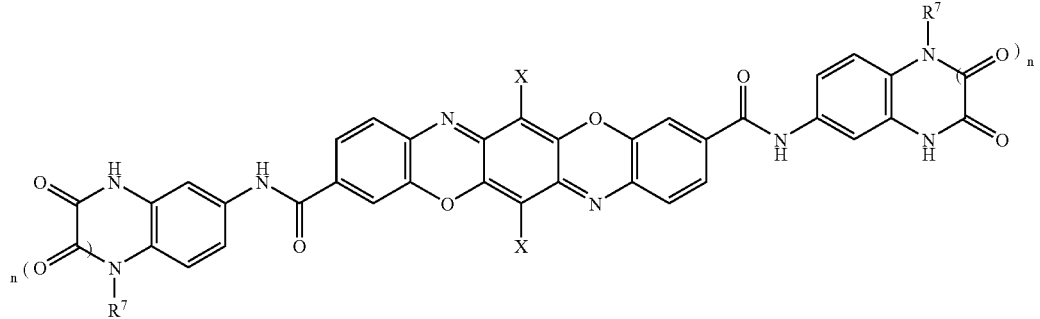

Formula (Ib)

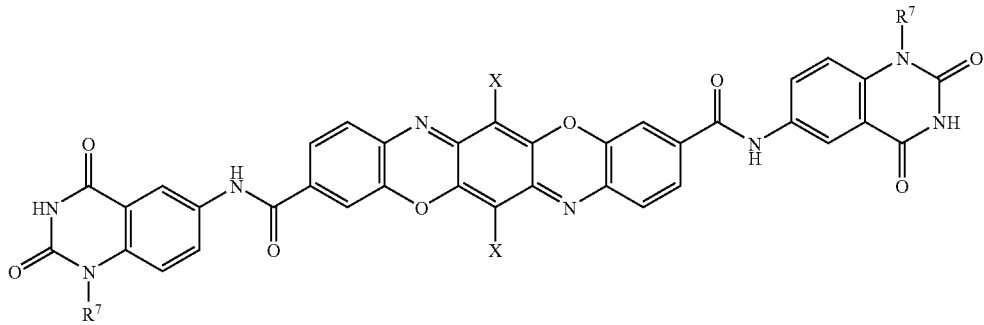

Formula (Ic)

where X is as defined above;

$R^2$, $R^3$, $R^4$, $R^5$ and $R^6$, are independently hydrogen, halogen, especially chlorine, $C_1$-$C_4$-alkyl, especially methyl or ethyl, or $C_1$-$C_4$-alkoxy, especially methoxy or ethoxy, although $R^1$, $R^3$ and $R^4$ are not all hydrogen.

$R^7$ is hydrogen, phenyl or $C_1$-$C_4$-alkyl, especially methyl or ethyl, and n is 0 or 1.

EP-A-0 400 429 describes the preparation of triphendioxazines as a one-stage process involving the action of perborates, percarbonates or mixtures on the appropriately substituted precursor in the presence of sulfuric acid. We have now determined that compounds of formula (I) are not obtainable in this way because either no reaction takes place or, under more severe conditions, a sulfonation reaction takes place, which militates against the formation of compounds (I), and/or the amide bonds are scissioned.

We have found that the novel compounds of formula (I) can be prepared according to the following scheme:

which comprises reacting a compound of formula (III) with an inorganic acid chloride to form an acid chloride of formula (IV) and condensing the latter with an aromatic amine of formula $NH_2$—$R^1$, where $R^1$ is as defined above, in an aprotic organic solvent.

The compound of formula (III) can be prepared by the method indicated in FR-A-789 805. However, we have found that, surprisingly, an oxidative ring closure in sulfuric acid can likewise be carried out with good yields and without disruptive secondary reactions when a compound of formula (II) is used as starting material. Ring closure is preferably effected in concentrated sulfuric acid, preferably 80% to 100% by weight in strength and more preferably 90% to 96% by weight in strength, using an oxidizing agent, preferably manganese dioxide, sodium peroxodisulfate, potassium peroxodisulfate, ammonium peroxodisulfate, sodium peroxocarbonate, potassium peroxocarbonate, ammonium peroxocarbonate, sodium perborate, potassium perborate or ammonium perborate, at a temperature between 0 and 60° C.

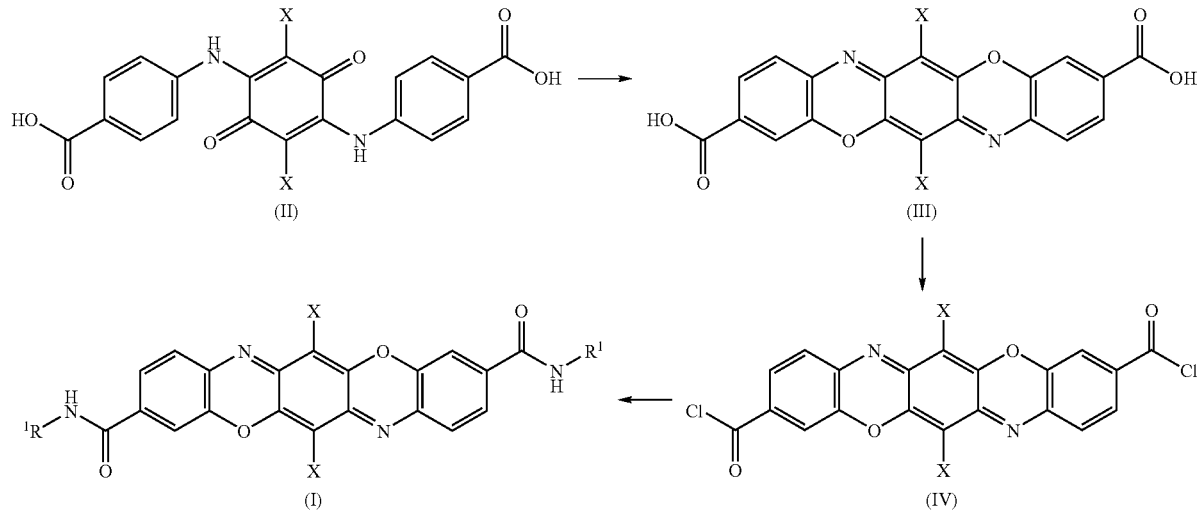

where X and $R^1$ are each as defined above.

FR-A-789 805 describes the preparation of the compounds of formulae (II) and (III) for X=Cl, using iron(III) chloride in nitrobenzene as oxidizing agent.

The present invention accordingly also provides a process for preparing a triphendioxazine pigment of formula (I), and preferably between 5 and 30° C. The product of formula (III) can be isolated from the reaction mixture by filtration either directly or after dilution with water.

The acid chloride of formula (IV) is obtainable from the free carboxylic acid by reaction with inorganic acid chlorides, preferably thionyl chloride, sulfuryl chloride, phosphorus oxychloride, phosphorus(III) chloride or phosphorus(V) chloride, more preferably thionyl chloride. The reaction advantageously takes place in an aprotic organic solvent, for example o-dichlorobenzene or chlorobenzene, with a 2 to 5 molar amount of the inorganic acid chloride, based on the compound of formula (III), and at temperatures between 40 and 100° C. and preferably between 70 and 90° C. Alternatively, the reaction also takes place on heating with an inorganic acid chloride without solvent in the presence of a catalytic amount of dimethylformamide at a temperature between 40 and 100° C. and preferably between 70 and 90° C.

The compound of formula (IV) is then condensed with an amine of formula $NH_2$—$R^1$ in an aprotic organic solvent, preferably chlorobenzene, o-dichlorobenzene, dimethylformamide or N-methylpyrrolidone, if appropriate in the presence of an auxiliary base, such as sodium carbonate, potassium carbonate, sodium bicarbonate, potassium bicarbonate, sodium acetate or potassium acetate. The reaction is advantageously carried out with two to three times the molar amount of amine of formula $NH_2$—$R^1$, based on the compound of formula (IV), and at temperatures between 20 and 150° C. and preferably between 70 and 120° C. It is often advantageous to convert the as-synthesized products (crude pigments) into a finely disperse form having often further improved pigmentary properties by aftertreatment in organic solvents in which the pigments themselves are not dissolved, and at elevated temperatures, for example at 60 to 200° C., especially at 70 to 150° C. and preferably at 75 to 100° C. The aftertreatment is preferably combined with a grinding or kneading operation.

The triphendioxazine pigments of the present invention are useful for pigmentation of macromolecular organic materials of natural or synthetic origin, for example of plastics, resins, coatings, paints, electrophotographic toners and developers, electret materials, color filters and also of inks, including printing inks, and seed.

Macromolecular organic materials which can be pigmented with the triphendioxazine pigments of the present invention are for example cellulose compounds, for example cellulose ethers and esters, such as ethylcellulose, nitrocellulose, cellulose acetates or cellulose butyrates, natural binders, for example fatty acids, fatty oils, resins and their conversion products, or manufactured resins, such as polycondensates, polyadducts, addition polymers and addition copolymers, such as for example amino resins, especially urea- and melamine-formaldehyde resins, alkyd resins, acrylic resins, phenoplasts and phenolic resins, such as novolaks or resoles, urea resins, polyvinyls, such as polyvinyl alcohols, polyvinyl acetals, polyvinyl acetates or polyvinyl ethers, polycarbonates, polyolefins, such as polystyrene, polyvinyl chloride, polyethylene or polypropylene, poly(meth)acrylates and their copolymers, such as polyacrylic esters or polyacrylonitriles, polyamides, polyesters, polyurethanes, coumaronein-dene and hydrocarbon resins, epoxy resins, unsaturated manufactured resins (polyesters, acrylates) having various curing mechanisms, waxes, aldehydic and ketonic resins, gum, rubber and its derivatives and latices, casein, silicones and silicone resins; individually or in admixtures. It is immaterial whether the macromolecular organic compounds mentioned are in the form of plastically deformable compositions, melts or in the form of spinning solutions, dispersions, coatings, paints or printing inks. Depending on the intended use, it will be advantageous to use the triphendioxazine pigments of the present invention as a blend or in the form of formulations or dispersions. Based on the macromolecular organic material to be pigmented, the triphendioxazine pigments of the present invention are used in an amount of from 0.05% to 30% by weight and preferably 0.1% to 15% by weight.

It is also possible in some cases to use a crude having a BET surface area of greater than 2 $m^2/g$ and preferably greater than 5 $m^2/g$ instead of the corresponding ground and/or finished triphendioxazine pigment of the present invention. This crude can be used for producing color concentrates in liquid or solid form in concentrations from 5% to 99% by weight, alone or if appropriate in admixture with other crudes or ready-produced pigments.

The triphendioxazine pigments of the present invention are also useful as a colorant in electrophotographic toners and developers, for example one- or two-component powder toners (also known as one- or two-component developers), magnetic toners, liquid toners, latex toners, addition polymerization toners and also specialty toners.

Typical toner binders are addition polymerization, polyaddition and polycondensation resins, such as styrene, styrene-acrylate, styrene-butadiene, acrylate, polyester and phenol-epoxy resins, polysulfones, polyurethanes, individually or in combination, and also polyethylene and polypropylene, which may each contain further ingredients, such as charge control agents, waxes or flow assistants, or may subsequently be modified with these additives.

The pigment compositions of the present invention are further useful as a colorant in powders and powder coatings, especially in triboelectrically or electrokinetically sprayable powder coatings used for surface coating of articles composed for example of metal, wood, plastic, glass, ceramic, concrete, textile material, paper or rubber.

Useful powder coating resins typically include epoxy resins, carboxyl- and hydroxyl-containing polyester resins, polyurethane and acrylic resins together with customary hardeners. Combinations of resins can also be used. For instance, epoxy resins are frequently used in combination with carboxyl- and hydroxyl-containing polyester resins. Typical hardener components (depending on the resin system) include for example acid anhydrides, imidazoles and also dicyandiamide and descendents thereof, blocked isocyanates, bisacylurethanes, phenolic and melamine resins, triglycidyl isocyanurates, oxazolines and dicarboxylic acids.

The present invention further provides for the use of the triphendioxazine pigments as a colorant for jettable printing inks, especially for inkjet inks. Inkjet inks refers not only to inks on an aqueous basis (including microemulsion inks) and on a nonaqueous basis (solvent-based), UV-curable inks but also to such inks as operate by the hot melt process.

Solvent-based inkjet inks contain essentially 0.5% to 30% by weight and preferably 1% to 15% by weight of the triphendioxazine pigments of the present invention, 70% to 95% by weight of an organic solvent or solvent mixture and/or of a hydrotropic compound. If appropriate, solvent-based inkjet inks can contain carrier materials and binders which are soluble in the solvent, examples being polyolefins, natural rubber, synthetic rubber, polyvinyl chloride, vinyl chloride-vinyl acetate copolymers, poly(vinyl butyral)s, wax-latex systems or combinations thereof. If appropriate, solvent-based inkjet inks may include further additives, examples being wetting agents, degassers/defoamers, preservatives and antioxidants.

Microemulsion inks are based on organic solvents, water and if appropriate an additional substance (surfactant) which acts as an interfacial mediator. Microemulsion inks contain in general 0.5% to 30% by weight and preferably 1% to 15% by weight of the triphendioxazine pigments of the present invention, 0.5% to 95% by weight of water and 0.5% to 95% by weight of organic solvents and/or interfacial mediators.

UV-curable inks contain essentially 0.5% to 30% by weight of the triphendioxazine pigments of the present invention, 0.5% to 95% by weight of water, 0.5% to 95% by weight of an organic solvent or solvent mixture, 0.5% to 50% by weight of a radiation-curable binder and if appropriate 0% to 10% by weight of a photoinitiator. Hot melt inks are usually based on waxes, fatty acids, fatty alcohols or sulfonamides which are solid at room temperature and liquefy on heating, the preferred melting range being between about 60 and about 140° C. Hot melt inkjet inks consist essentially of 20% to 90% by weight of wax and 1% to 10% by weight of the triphendioxazine pigments of the present invention. They may further include 0% to 20% by weight of an additional polymer (as "dye dissolver"), 0% to 5% by weight of dispersant, 0% to 20% by weight of viscosity modifier, 0% to 20% by weight of plasticizer, 0% to 10% by weight of tackifying additive, 0% to 10% by weight of transparency stabilizer (prevents crystallization of waxes, for example) and also 0% to 2% by weight of an antioxidant.

Jettable printing inks, especially inkjet inks, can be produced by dispersing the triphendioxazine pigment into the microemulsion medium, into the nonaqueous medium or into the medium for producing the UV-curable ink or into the wax for producing a hot melt inkjet ink.

Advantageously, the as-obtained inks for inkjet applications are subsequently filtered, for example through a 1 μm filter.

The triphendioxazine pigments of the present invention are further useful as a colorant for color filters, not only for additive but also for subtractive color generation, and also as a colorant for electronic inks ("e-inks") or electronic paper ("e-paper"). To produce color filters, not only reflecting but also transparent color filters, pigments are applied in the form of a paste or as a pigmented photoresist in a suitable binder (acrylates, acrylic esters, polyimides, polyvinyl alcohols, epoxides, polyesters, melamines, gelatin, caseins) to the respective LCD components (e.g. TFT-LCD=Thin Film Transistor Liquid Crystal Displays or for example ((S)TN-LCD=(Super) Twisted Nematic-LCD). As well as a high thermal stability, a high pigment purity is a prerequisite for a stable paste or a pigmented photoresist. In addition, the pigmented color filters can also be applied by ink jet printing processes or other suitable printing processes.

To evaluate the properties of the pigments produced according to the present invention in the coating sector an alkyd-melamine resin varnish based on a medium-oil, non-drying alkyd resin (AM) was selected from the multiplicity of existing coatings.

The pigments of the present invention are notable for good fastness properties; more particularly, they possess high solvent fastnesses and high lightfastnesses. They are free of the environmentally unsafe heavy metals. The recited properties make the pigments of the present invention particularly useful as colorants in the printing sector (especially nonjettable printing inks, production of inkjet inks) and also for use in coatings and in plastics, color filters, toners and for coloration of seed.

Parts are by weight in the examples which follow.

EXAMPLE 1

To 62.5 parts of ethanol (96%) are added 3.4 parts of 4-aminobenzoic acid. To the solution are added 1.0 part of water and 4.1 parts of sodium acetate (anhydrous). The mixture is heated and admixed with 3.2 parts of chloranil a little at a time at 59 to 69° C. After a reaction time of 17 hours at about 77° C., the batch is allowed to cool down to room temperature with stirring. Following addition of 3.5 parts of hydrochloric acid (30%), the batch is stirred at room temperature for one hour. The precipitate is filtered off, washed with ethanol and then with distilled water and dried at 75° C. under reduced pressure to obtain 4.9 parts of the target compound. For purification, the press cake is stirred in 38.6 parts of NMP for one hour, and the residue is filtered off and washed with a further 38.6 parts of NMP. The press cake is then subjected to this purifying operation once more and, after the rinse with NMP, washed with distilled water to obtain 3.6 parts of a compound having the following formula:

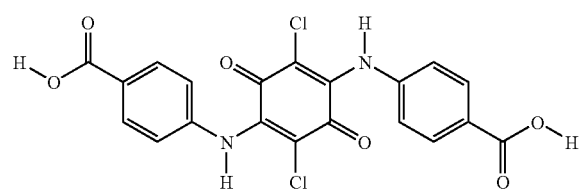

Yield: 64%

$^1$H NMR (DMSO-d6): 12.8 (s(br), 2H, COOH); 9.8 (s, 2H, amide-NH); 7.8 (d, 4H, arom. CH, $^3$J=8.7 Hz); 7.1 (d, 4H, arom. CH, $^3$J=8.7 Hz).

MALDI-TOF (DHB; m/z): 445.5

EXAMPLE 2

To 45.6 parts of sulfuric acid (96%) are added 2.5 parts of benzoquinone of Example 1, and stirred for 15 min, at room temperature. During 90 min, 2.0 parts of manganese dioxide (90-95%, activated) are added such that the temperature does not climb above 40° C. The suspension is filtered. The filter residue is thoroughly washed with sulfuric acid (96%) and the dark brown filtrate is poured into 330 parts of ice-water. After 15 min the precipitate is filtered off and the filter cake is thoroughly washed with distilled water until acid free and with ethanol. For purification, the solid is suspended in 30 parts of dioxane, heated at the boil for a few minutes, and subsequently the residue is filtered off while still hot. The oxidation product is subsequently resubjected to this purifying procedure. Filtration is followed by thorough washing with dioxane and the resulting reddish brown solid is dried at 80° C. under reduced pressure to leave 1.1 parts of a triphendioxazine of the following formula:

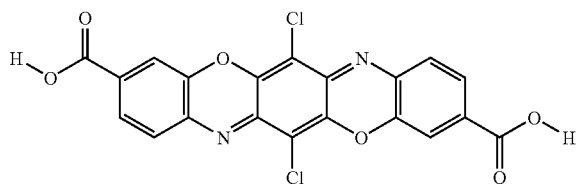

Yield: 45%
MALDI-TOF (DHB; m/z): 443.3

EXAMPLE 3

To 615.1 parts of thionyl chloride are added 58.9 parts of the triphendioxazine-carboxylic acid of Example 2 and 1.0 part of DMF. After a reaction time of 6 hours at 75° C. the batch is cooled with ice. Following stirring in an ice bath for one hour, the precipitate is filtered off with suction and thoroughly washed with hexane to obtain 39.6 parts of a brown solid of the following formula:

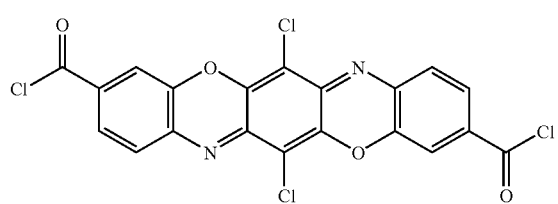

Yield: 62%
MALDI-TOF (DHB): 480.4

EXAMPLE 4

To NMP is added 1.0 equivalent of finely powdered triphendioxazine acid chloride of Example 3 (batch size: see table) with stirring. To the mixture are added 2.0 to 2.5 equivalents of amine component (in NMP) and, if appropriate, 2.0 to 2.5 equivalents of potassium carbonate, and the temperature is observed to rise. Following the reaction time at 20-120° C. (see table), the suspension is cooled down and the precipitate is filtered off. The filter cake is thoroughly washed with ethanol and water. The crude pigment is suspended in DMF and stirred at 120° C. The precipitate is filtered off hot, washed with DMF and then with water and dried under reduced pressure to leave a reddish brown to reddish violet product of the following formula:

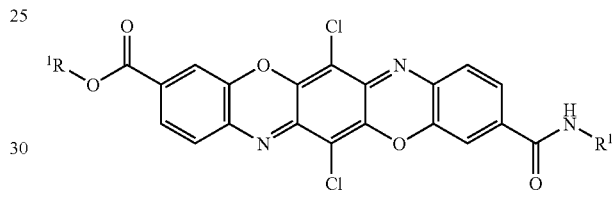

where $R^1$ is determined by the amine component used.

TABLE 1

(Examples 4A-4R)

| Ex. | Amine component $R^1$-$NH_2$ in NMP (ml) | Batch size (mol) | NMP (ml, acid chloride) | $K_2CO_3$ | t (h) | T (° C.) | Yield |
|---|---|---|---|---|---|---|---|
| 4A | 2-Methoxyphenylamine (100) | 0.093 | 500 | yes | 1 | 70 | 31% |
| 4B | 3-Methoxyphenylamine (100) | 0.084 | 500 | yes | 2 | 80 | 25% |
| 4C | 2-Chloroaniline (100) | 0.113 | 800 | yes | 2 | 70 | 36% |
| 4D | 4-Chloroaniline (100) | 0.094 | 900 | yes | 12 | 20 | 46% |
| 4E | 2-Ethoxyphenylamine (100) | 0.078 | 700 | yes | 1 | 70 | 37% |
| 4F | 3,5-Dimethylaniline (100) | 0.094 | 800 | yes | 4 | 120 | 19% |
| 4G | Methyl 2-aminobenzoate (80) | 0.092 | 800 | yes | 2 | 80 | 31% |
| 4H | 3-Tolylamine (50) | 0.025 | 350 | yes | 3 | 120 | 88% |
| 4I | 3-Chloroaniline (50) | 0.090 | 350 | no | 3 | 120 | 92% |
| 4J | 6-Amino-7-methoxy-1,4-dihydroquinoxaline-2,3-dione (250) | 0.023 | 250 | no | 3 | 120 | 73% |
| 4K | 5-Amino-1-methyl-1,3-dihydrobenzimidazol-2-one (100) | 0.038 | 350 | no | 3 | 120 | 63% |
| 4L | 5-Amino-1-ethyl-1,3-dihydrobenzimidazol-2-one (100) | 0.041 | 350 | no | 3 | 120 | 87% |
| 4M | 4-Aminoacetanilide (200) | 0.043 | 350 | no | 3 | 120 | 93% |
| 4N | 6-Amino-1-methyl-1H-quinazoline-2,4-dione (400) | 0.050 | 350 | no | 5 | 120 | 80% |
| 4O | 6-Amino-1-methyl-1,4-dihydroquinoxaline-2,3-dione (300) | 0.050 | 350 | no | 3 | 120 | 98% |
| 4P | 4-Tolylamine (100) | 0.029 | 220 | no | 0.5 | 120 | 94% |
| 4Q | 2-Aminobenzamide (100) | 0.025 | 250 | no | 3 | 120 | 95% |
| 4R | 4-Aminobenzamide (100) | 0.042 | 350 | no | 2.75 | 120 | 75% |

TABLE 2

(Examples 4A-4R, mass spectometry)

| Example | MALDI-TOF (DHB; m/z) |
|---|---|
| 4a | 652.8 |
| 4b | 653.6 |
| 4c | 662.6 |
| 4d | 662.6 |
| 4e | 682.0 |
| 4f | 648.7 |
| 4g | 708.7 |
| 4h | 620.4 |
| 4i | 662.6 |
| 4j | 842.7 (M + Na+) |
| 4k | 732.8 |
| 4l | 761.8 |
| 4m | 706.2 |
| 4n | 788.8 |
| 4o | 788.3 |
| 4p | 620.6 |

TABLE 2-continued (Examples 4A-4R, mass spectometry)

| Example | MALDI-TOF (DHB; m/z) |
|---|---|
| 4q | 678.0 |
| 4r | 678.5 |

EXAMPLE 5

An initial charge is prepared of 1.0 part of finely powdered acid chloride of Example 3 in 12.0 parts of o-dichlorobenzene, and admixed with 1.4 parts of 3,5-dichloroaniline dissolved in 3.0 parts of o-dichlorobenzene. Following a reaction time of 2 hours at 120° C. the batch is cooled down to room temperature and the precipitate is filtered off and washed with ethanol and with water. The crude pigment is suspended in DMF and stirred at 120° C. The precipitate is filtered off hot, washed with DMF and then with water and dried under reduced pressure to leave a brown product of the following formula:

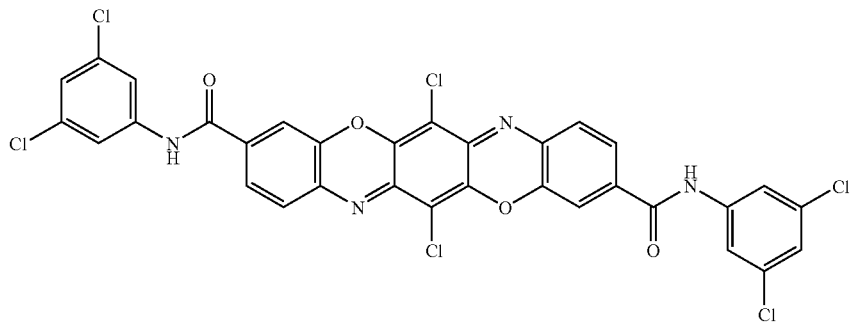

Yield: 45%

MALDI-TOF (DHB; m/z): 730.7

APPLICATION EXAMPLES 4 parts of a pigment from the table hereinbelow are bead milled for 30 min with 96 parts of a mixture of 50 parts of a 60% by weight solution of cocoaldehyde-melamine resin in butanol, 10 parts of xylene and 10 parts of ethylene glycol monomethyl ether.

The dispersion obtained is applied to a piece of cardboard, air dried for 30 min and baked at 140° C. for 30 min. The solvent fastnesses, color strengths and lightfastnesses of the pigments prepared in the preceding examples are reported in Table 3.

TABLE 3

(Examples 4A-4R and 5)

| Ex. | Amine component | Color | LME | FST | LiE/VT | LiE/AH |
|---|---|---|---|---|---|---|
| 4A | 2-Methoxyphenylamine | bluish red | 4 | 2.18 | 6-7 | 6 |
| 4B | 3-Methoxyphenylamine | bluish red | 4-5 | 2.58 | 6-7 | 6 |
| 4C | 2-Chloroaniline | brown | 4-5 | 1.68 | 8 | 6-7 |
| 4D | 4-Chloroaniline | yellowish red | 4 | 7.56 | 7-8 | 6 |
| 4E | 2-Ethoxyphenylamine | bluish red | 4-5 | 1.71 | 7-8 | 6-7 |
| 4F | 3,5-Dimethylaniline | yellowish red | 4 | 4.30 | 7-8 | 6 |
| 4G | Methyl 2-aminobenzoate | reddish brown | 3-4 | 3.66 | 8 | 6-7 |
| 4H | 3-Tolylamine | red/bordeaux | 4-5 | 2.70 | 6-7 | 6 |

TABLE 3-continued (Examples 4A-4R and 5)

| Ex. | Amine component | Color | LME | FST | LiE/VT | LiE/AH |
|---|---|---|---|---|---|---|
| 4I | 3-Chloroaniline | bluish red | 4 | 2.67 | 7-8 | 6 |
| 4J | 6-Amino-7-methoxy-1,4-dihydroquinoxaline-2,3-dione | reddish violet | 5 | 2.09 | 8 | 7 |
| 4K | 5-Amino-1-methyl-1,3-dihydrobenzimidazol-2-one | bluish violet | 4-5 | 4.23 | 8 | 7 |
| 4L | 5-Amino-1-ethyl-1,3-dihydro-benzimidazol-2-one | violet | 4 | 2.75 | 8 | 7-8 |
| 4M | 4-Aminoacetanilide | reddish violet | 5 | 4.45 | 8 | 7 |
| 4N | 6-Amino-1-methyl-1H-quinazoline-2,4-dione | reddish violet | 5 | 4.38 | 8 | 7 |
| 4O | 6-Amino-1-methyl-1,4-dihydroquinoxaline-2,3-dione | reddish violet | 4-5 | 5.15 | 7-8 | 6 |
| 4P | 4-Tolylamine | bluish red | 5 | 1.81 | 6-7 | 4-5 |
| 4Q | 2-Aminobenzamide | violet | 4-5 | 2.90 | 8 | 7-8 |
| 4R | 4-Aminobenzamide | red | 5 | 2.42 | 7-8 | 6 |
| 5 | 3,5-Dichloroaniline | yellowish brown | 2-3 | 4.41 | 8 | 6-7 |

COMPARATIVE EXAMPLE

An initial charge is prepared of 1.0 part of finely powdered acid chloride of Example 3 in 24.5 parts of o-dichlorobenzene. Following the addition of 1.0 part of aniline the reaction mixture is heated to 150° C. A further 10.0 parts of o-dichlorobenzene are added and the reaction batch is subsequently heated to 170° C. over 30 min. The suspension is stirred at 170° C. for a further half hour. After cooling down, the crude product is filtered off and the filter cake is washed with o-dichlorobenzene and with water and dried at 80° C. under reduced pressure. The crude pigment is suspended in 20.0 parts of DMF and refluxed with stirring. After a reaction time of 2 hours the precipitate is filtered off hot, washed with DMF and then with water and dried under reduced pressure to leave a red product of the following formula:

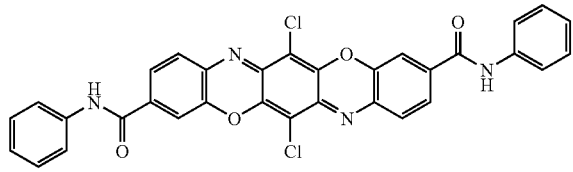

Yield: 86%

This compound was found to be unsuitable for practical use because of its low lightfastness (LiE/AH=3).
LME=solvent fastness
FST=color strength
LiE/VT=lightfastness masstone
LiE/AH=lightfastness reduction Solvent fastness was determined against the DIN 54002 5-point gray scale.

Color strength indicates how many parts of $TiO_2$ are needed to produce 1 part of chromatic pigment to ⅓ standard depth of shade: 1:×$TiO_2$ (Color strength and its measurement is defined according to DIN EN ISO 787-26) Lightfastness was determined against the 8 point blue scale on the lines of DIN 54003 in masstone and in reduction: "8" corresponds to the highest lightfastness, "1" to the lowest.

We claim:

1. A triphendioxazine pigment of formula (I)

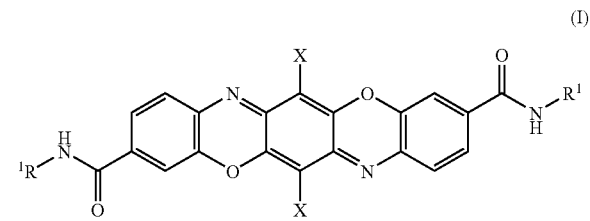

where

X is hydrogen or chlorine, and $R^1$ is phenyl substituted with 1 to 5 radicals selected from the group consisting of $C_1$-$C_4$-alkyl, halogen, $C_1$-$C_4$-alkoxy, acetylamino, aminocarbonyl, methylaminocarbonyl and $C_1$-$C_4$-alkoxycarbonyl;

or is phenyl fused 2,3- or 3,4- with a bivalent radical of the formula —NH—(CO)$_m$—NR$^2$—, —CR$^2$=CH—CO—NH—, —CR$^2$=N—CO—NH—, —CO—NH—CO—NR$^2$—, —CO—(NH)$_m$—CO— or —O—(CO)$_m$—NH— to form a five- or six-membered ring, where $R^2$ is hydrogen, methyl, ethyl or phenyl and m is 1 or 2.

2. A triphendioxazine pigment according to claim 1, wherein formula (1) is formula (Ia),

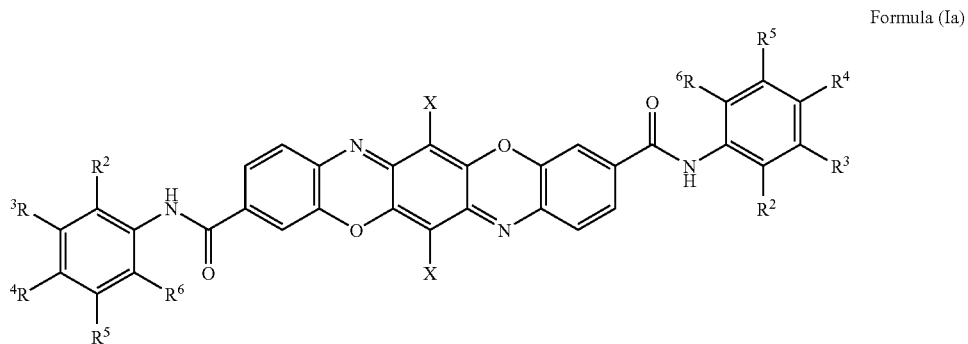

Formula (Ia)

wherein $R^2$, $R^3$, $R^4$, $R^5$ and $R^6$, are independently hydrogen, halogen, $C_1$-$C_4$-alkyl, or $C_1$-$C_4$-alkoxy, with the proviso that $R^2$, $R^3$ and $R^4$ are not all hydrogen.

3. A triphendioxazine pigment according to claim 1, wherein formula (1) is formula (Ib),

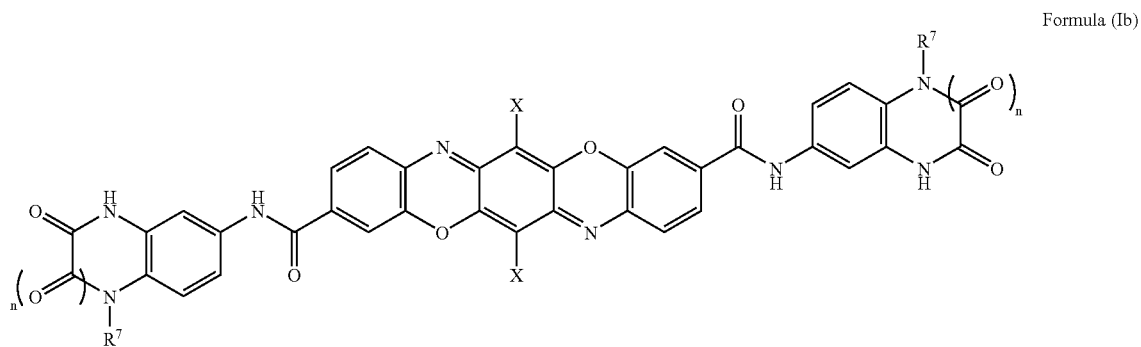

Formula (Ib)

where $R^7$ is hydrogen, phenyl or $C_1$-$C_4$-alkyl, and n is 0 or 1.

4. A triphendioxazine pigment according to claim 1, wherein formula (I) is formula (Ic),

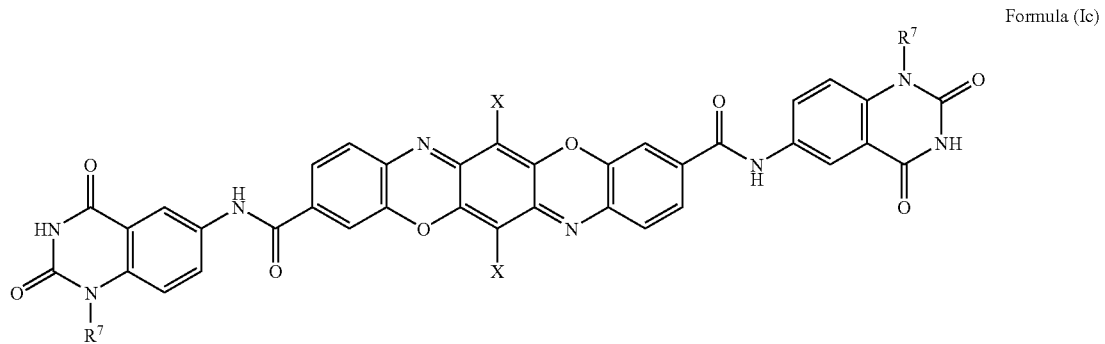

Formula (Ic)

where $R^7$ is hydrogen, phenyl or $C_1$-$C_4$-alkyl.

5. A process for preparing a triphendioxazine pigment according to claim 1, comprising the step of reacting a compound of formula (III)

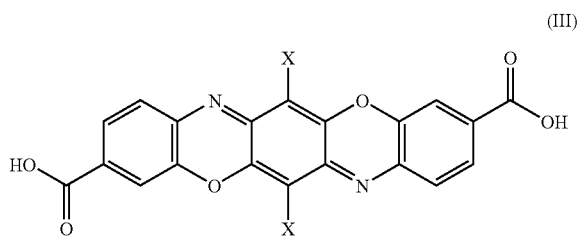

with an inorganic acid chloride to form an acid chloride of formula (IV)

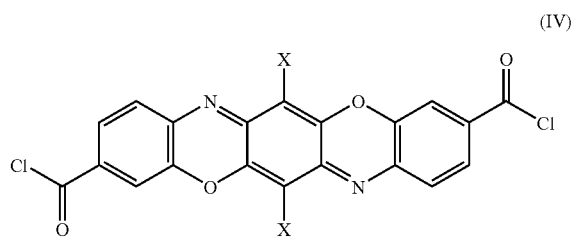

and condensing the acid chloride of formula (IV) with an aromatic amine of the formula $NH_2-R^1$ in an aprotic organic solvent.

6. The process according to claim 5 further comprising the step of forming the compound of formula (III) by ring closure of a compound of formula (II)

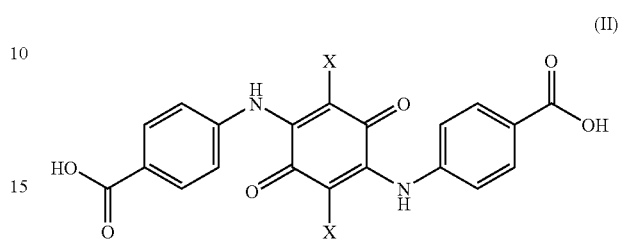

in concetrated sulfuric acid and using an oxidizing agent.

7. A triphendioxazine pigment according to claim 2, wherein $R^2$, $R^3$, $R^4$, $R^5$ and $R^6$, are independently chlorine, methyl, ethyl, methoxy or ethoxy.

8. A triphendioxazine pigment according to claim 3, wherein $R^7$ is methyl or ethyl.

9. A triphendioxazine pigment according to claim 4, wherein $R^7$ is methyl or ethyl.

* * * * *